United States Patent [19]
Wilford

[11] Patent Number: 5,521,274
[45] Date of Patent: May 28, 1996

[54] POLYSULFIDE-MODIFIED EPOXY RESINS

[75] Inventor: Andrea Wilford, Whoberly, England

[73] Assignee: Morton International Limited, Hounslow, England

[21] Appl. No.: 350,761

[22] Filed: Dec. 6, 1994

Related U.S. Application Data

[63] Continuation of Ser. No. 987,855, Dec. 9, 1992, abandoned.

[30] Foreign Application Priority Data

Dec. 19, 1991 [GB] United Kingdom ............ 9126902

[51] Int. Cl.$^6$ ............... C08G 59/40; C08G 65/00
[52] U.S. Cl. ............ 528/109; 528/103; 528/387; 525/524; 525/535
[58] Field of Search ................ 528/109, 387, 528/103; 525/535, 524

[56] References Cited

U.S. PATENT DOCUMENTS

| | | | |
|---|---|---|---|
| 2,789,958 | 4/1957 | Fettes et al. | 260/42 |
| 2,919,255 | 12/1959 | Hart | 260/23 |
| 3,318,973 | 5/1967 | Hill | 260/837 |
| 3,894,977 | 7/1975 | Brown et al. | 260/18 EP |
| 4,017,554 | 4/1977 | Villa | 260/830 S |
| 4,187,348 | 2/1980 | Dearlove et al. | 428/418 |
| 4,255,561 | 3/1981 | Wood et al. | 528/388 |
| 4,316,979 | 2/1982 | Paul | 528/109 |
| 4,595,714 | 6/1986 | McAllister et al. | 523/179 |
| 4,656,095 | 4/1987 | McAllister et al. | 523/179 |
| 4,755,570 | 7/1988 | Hefner, Jr. | 525/529 |
| 5,128,424 | 7/1992 | McGinnis et al. | 525/481 |

FOREIGN PATENT DOCUMENTS

| | | |
|---|---|---|
| 55-71763 | 5/1980 | Japan . |
| 55-137127 | 10/1980 | Japan . |
| 59-129221 | 7/1984 | Japan . |
| 9105354 | 2/1982 | WIPO . |

*Primary Examiner*—Melvyn I. Marquis
*Assistant Examiner*—Randy Gulakowski
*Attorney, Agent, or Firm*—Robert M. Didrick; Gerald K. White

[57] ABSTRACT

A polysulfide-modified epoxy resin system in which, upon curing, the polysulfide rubber phase separates into discrete particles, typically 1 to 5 μm in size, to enhance physical properties such as peel strength without any significant reduction in glass transition temperature. The phase separation is brought about by using as a modifier a liquid polysulfide containing a high proportion of polymethylene groups of 4 to 12 carbon atoms. The polysulfide may be adducted with an excess of epoxy resin prior to incorporation in the composition.

11 Claims, 4 Drawing Sheets

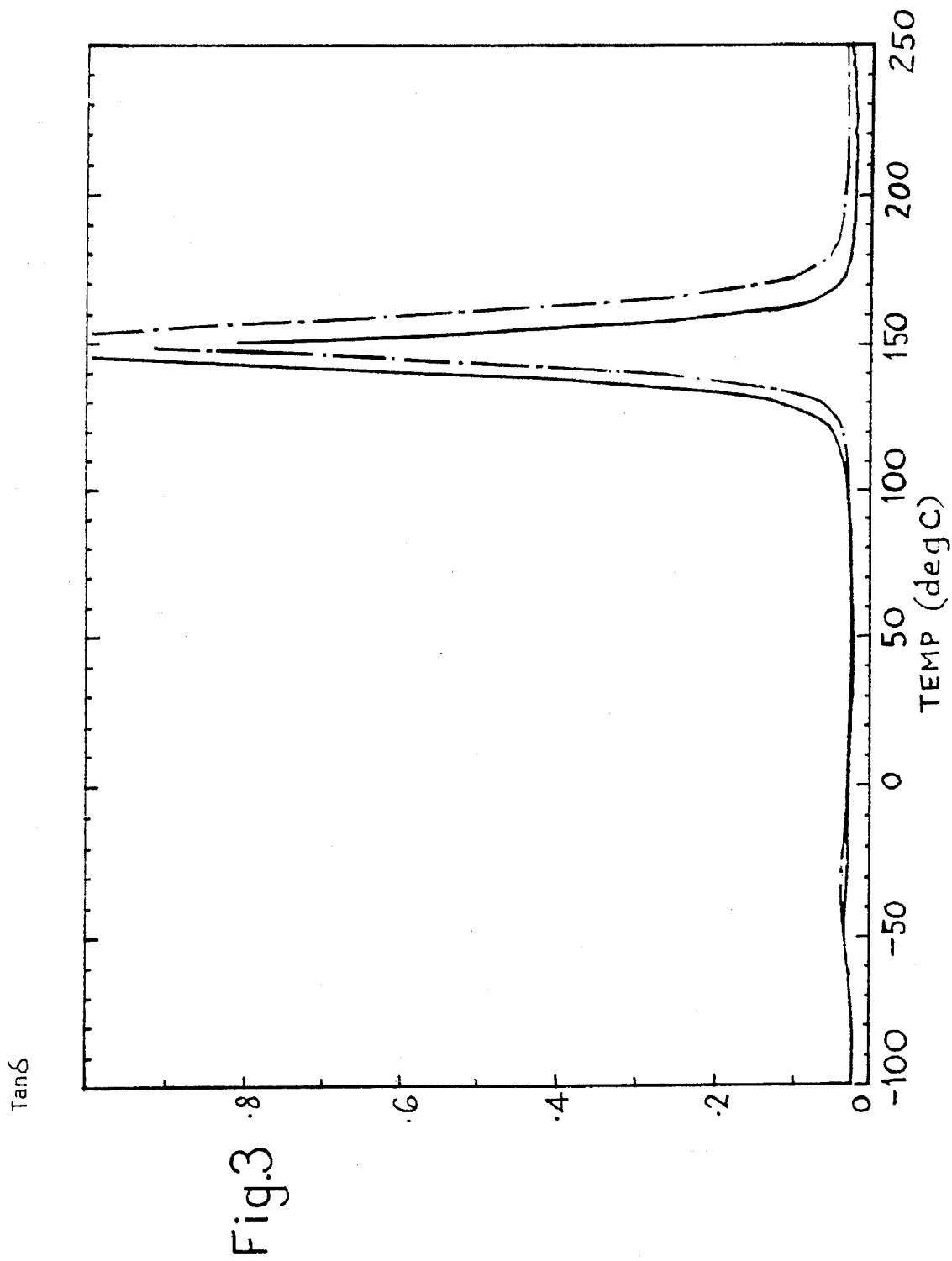

POLYSULFIDE-MODIFIED EPOXY RESINS

This application is a continuation application of Ser. No. 07/987,855 filed on Dec. 9, 1992, now abandoned.

BACKGROUND OF THE INVENTION

1. Field of the Invention

This invention relates to epoxy resin compositions toughened by blending with a modified liquid polysulfide.

Toughened epoxy resin compositions are used in a wide variety of applications, notably in the automotive industry, for forming rigid seals and bonds between components. Such resins offer high resistance to mechanical stresses, even at high temperatures.

2. Description of the Prior Art

One commonly used toughening agent for epoxy resins is carboxyl-terminated butadiene nitrile rubber. This has excellent properties but is expensive and difficult to handle.

Epoxy resins have been modified with liquid polysulfides such as LP-3 and ELP-3 of Morton International Inc. The resulting compositions have however not shown much improvement in peel strength and they have the added disadvantage that the glass transition temperature Tg shows a marked decrease. The compositions thus cannot be used at such high temperatures without changing from a vitreous to a rubbery state with consequent loss of strength.

SUMMARY OF THE INVENTION

We have now unexpectedly found that by careful selection of the polysulfide modifying agent an epoxy system can be produced wherein the polysulfide rubber phase separates into discrete particles, typically from 1 to 5 μm in size. As a result of this phase separation the high Tg of the epoxy resin, typically 145°–150° C., is not significantly decreased and there are increases in lap shear strength and, more particularly, in peel strength.

The present invention consists in a polysulfide-modified epoxy resin composition comprising an epoxy resin and 5 to 30 weight parts per hundred weight parts of epoxy resin of a liquid polysulfide having a polymer backbone with repeating units of general formula —SS—X—SS—X— wherein at least 20 mole % of the groups X are polymethylene groups of 4 to 12 carbon atoms and wherein the product of the molar percentage of said groups X which are polymethylene groups and the average number of carbon atoms in said polymethylene groups is from 200 to 450. The preferred polysulfides contain $C_6$-$C_{10}$ polymethylene groups (hereinafter referred to for simplicity as alkane groups) and formal groups, linked by disulphide bonds, the molar proportion of alkane groups preferably being as high as possible while maintaining the viscosity at a workable level. In a decane-modified polysulfide the molar ratio of decane to formal groups is preferably from 20:80 up to 45:55, a preferred ratio being about 40:60. Hexane-modified liquid polysulfides can contain still higher mole ratios of hexane:formal groups without rendering the modified epoxy resin too solid to work with prior to curing. The preferred range of ratios for the hexane-modified polymers is from 35:65 up to 70:30. The liquid polysulfide preferably has an average molecular weight of 1000 to 8000, more preferably 2000 to 6000.

A convenient way of obtaining an alkane-modified polysulfide with the required ratio of alkane groups is to start with a polysulfide having less than the required alkane content, suitably a commercially available liquid polysulfide having up to 100% of formal groups and little or no alkane content, blending it with a liquid polysulfide having a higher alkane content than required and heating the blend to bring about a sulphur—sulphur interchange reaction whereby the disulphide bonds break and redistribute themselves. One suitable starting material is ZL 2271, which is a decane-modified polysulfide having an average molecular weight of about 4000 and a formal:decane mole ratio of 50:50. It thus includes units having the formula:

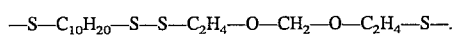

The 50:50 mole ratio of this composition is too high for use directly in modifying epoxy resins in accordance with the invention, since the polymer is solid at room temperature and thus difficult to work with. The decane content is therefore reduced by blending with a liquid polysulfide such as Morton LP2C, which has an average molecular weight of 4000, a mercaptan content of 1.5–2.0 mole % and a degree of branching of 2 mole %. The resulting mercaptan-terminated polymer is preferably then adducted with an excess of liquid epoxy resin to give an adduct/epoxy resin blend which in turn is added to the epoxy resin to be modified. The resulting composition preferably has an adduct content of 5 to 30 g per 100 g of epoxy resin.

The polysulphide-modified epoxy resin can be cured with a conventional amine or amide curative such as dicyandiamide. Cure accelerators which may be used include 3-phenyl-1,1-dimethyl urea or, more preferably, tolyl bis (dimethyl urea). A suitable cure schedule is 30 min. at 140° C.

Further objects and advantages of the invention will become apparent from the following detailed description when read with reference to the accompanying drawings which illustrate preferred embodiments thereof.

BRIEF DESCRIPTION OF THE DRAWINGS

FIG. 3 is a comparison of the tan δ traces for the systems of FIGS. 1 and 2.

DETAILED DESCRIPTION OF THE PREFERRED EMBODIMENTS

Figure 1:
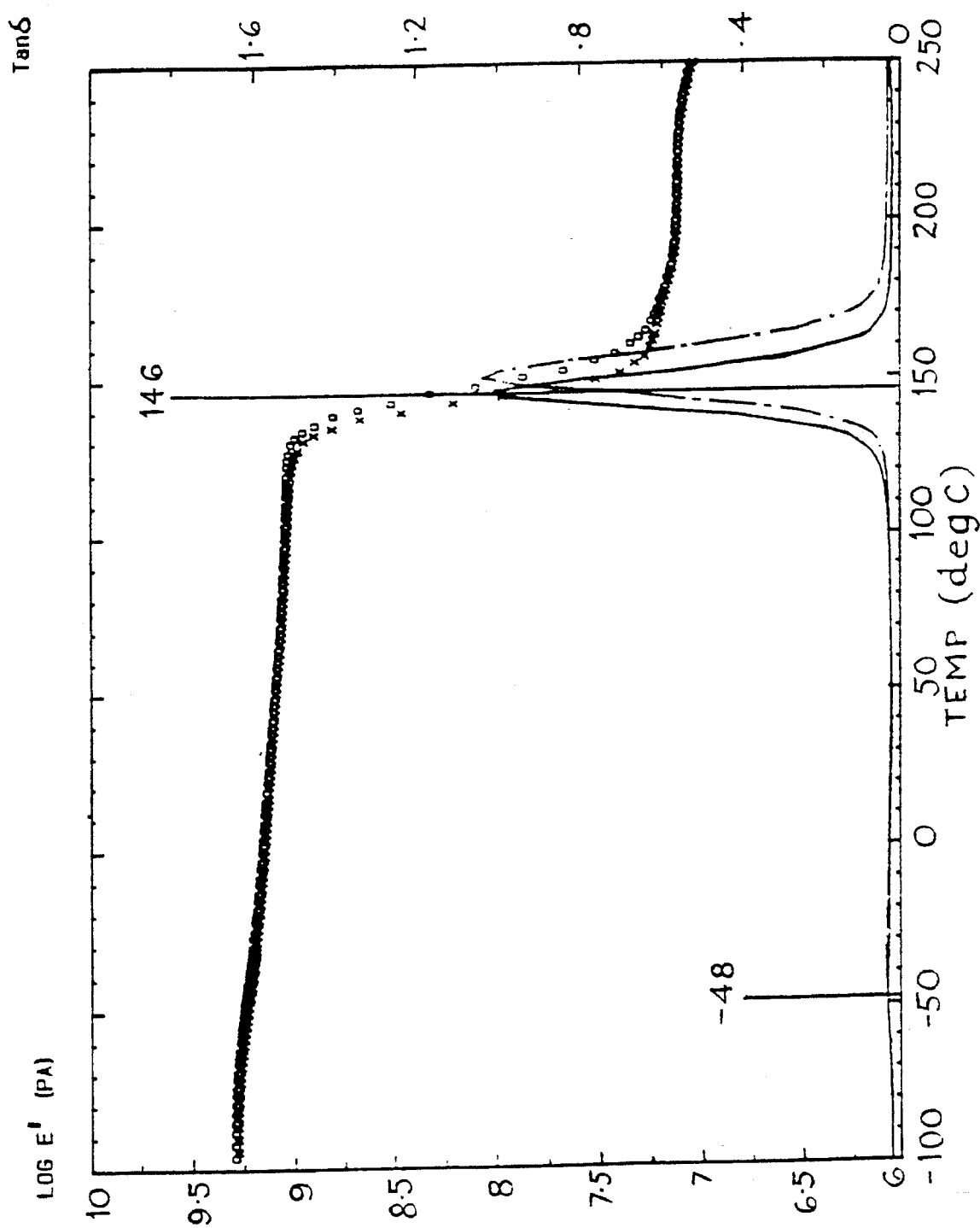
FIG. 1 is a DMTA trace of an unmodified epoxy resin composition.

The following examples illustrate preferred embodiments of the invention.

EXAMPLE 1

1-part heat-cure adhesive compositions were made up comprising an epoxy resin, a decane-modified polysulfide adducted with excess epoxy resin, a dicyandiamide curative, a cure accelerator and a calcium carbonate filler. Details of the compositions are as follows:

Epoxy Resin

The epoxy resin used was a standard liquid DGEBA resin with an epoxide content of ca. 5.32 moles/Kg, (Epoxide resin 300).

Liquid Polysulfide Adduct

A decane-modified liquid polysulfide ZL-2271-20, prepared from 1,10-dibromodecane monomer and bis-(2-chloroethyl) formal, having a formal:decane mole ratio of 80:20 was supplied by Morton International, Inc., Woodstock, Ill., USA. Further samples having a higher decane content were prepared by heating a 50:50 formal:decane mole ratio polysulfide ZL-2271-50, from the same source, with Morton LP2C, described above. The ZL-2271-50, which was a waxy solid at room temperature was blended with LP2C to produce polymers of 70:30 and 60:40 formal-decane mole ratios, designated ZL-2271-30 and ZL-2271-40 respectively. The ratios of LP2C and ZL-2271-50 used were as follows:

|  | ZL-2271-40 | ZL-2271-30 |
|---|---|---|
| LP2C | 18 g | 37 g |
| ZL-2271-50 | 82 g | 63 g |

The mixtures were heated at 70°–80° C. with stirring for ca. 5 hours to allow the redistribution reaction to occur. The ZL-2271-40 was a waxy solid but softer than ZL-2271-50, whereas the ZL-2271-30 was a soft, "fudgey" material. Both of these polysulfides, along with the original 80:20 formal:decane mole ratio material ZL-2271-20, were then adducted with epoxy resin using a 10:1 mole ratio of epoxy resin to polysulfide polymer.

The resin/polysulfide mixture was heated to 70°–80° C., with stirring until the mercaptan content measured less than 0.1%. This mixture of unreacted epoxy resin and LP-epoxy adduct was added to the adhesive formulations to give polysulfide levels of 10 and 20 phr, as shown in Table 1, formulations 2 and 3. All the adducts produced were liquids.

Curative

The curative used was a micronised dicyandiamide curing agent Dyhard 100s.

Cure Accelerator

Three accelerators were evaluated. Initial cure studies were carried out using the PL DSC 700, the aim being to find an accelerator level which gave full cure after 30 minutes at 140° C. The accelerators and the levels ultimately used are shown below:

Amicure UR2T—tolyl bis (dimethylurea) 1 phr
Dyhard MI—2-methylimidazole 0.5 phr
Dyhard UR300—3-phenyl-1, 1-dimethylurea 1 phr The effect of the accelerators on the epoxy Tg of the material was evaluated by dynamic mechanical thermal analysis (DMTA) using the epoxy control adhesive system, (Table 1, formulation 1). The results are given in Table 1. No further work was carried out using the 2-methylimidazole as it was found that the formulated adhesive had a very limited shelf life at room temperature.

TABLE 1

| Accelerator | Tg at 1 Hz/°C. |
|---|---|
| Amicure UR2T | 152 |
| Dyhard 300 | 146 |
| Dyhard M1 | 155 |
| No accelerator | 145 |

Ramp rate = 3° C./min
Cure = 30 minutes at 140° C. except no accelerator system which was cured for 30 minutes at 190° C.

The adducts were formulated into adhesives according to the formulations in Table 2, including stearic acid-coated precipitated calcium carbonate (Winnofil SPT) to allow for easier handling at elevated temperatures. A thin sheet of each system was made for DMTA analysis and lap-shear and T-peel samples were also made. The cure schedule in all cases was 30 minutes at 140° C.

TABLE 2

| Formulation No. | 1 | 2 | 3 |
|---|---|---|---|
| Epoxide resin 300 | 100 g | 87.5 g | 75 g |
| Adduct blend | — | 22.5 g | 45 g |
| Winnofil SPT | 20 g | 20 g | 20 g |
| Dyhard 100S Curative | 8 g | 8 g | 8 g |
| Accelerator | *level as appropriate | | |

For Dyhard 300 = 1 g, for Dyhard M1 = 0.5, for Amicure UR2T = 1 g

The results of the DMTA, lap shear and T-peel strength tests using Dyhard UR300 (3-phenyl-1,1-dimethylurea accelerator) are shown in Table 3:

TABLE 3

| System | <sup>a</sup>Lap shear strength/MPa | <sup>b</sup>T-peel N | <sup>c</sup>Tg at 1 Hz/°C. Epoxy | Rubber |
|---|---|---|---|---|
| No polysulfide | 25.4 ± 1.7 | 12.5 | 148 | — |
| 10 phr polysulfide | | | | |
| ZL-2271-20 | 29.8 ± 0.8 | 12.20 | 130 | — |
| ZL-2271-30 | 31 ± 1.9 | 16.6 | 136 | — |
| ZL-2271-40 | 29.5 ± 1.3 | 16.3 | 140 | −49 |
| 20 phr polysulfide | | | | |
| ZL-2271-20 | 31.2 ± 0.7 | 14.5 | 128 | −52 |
| ZL-2271-30 | 26 ± 1.8 | 15 | 133 | −46 |
| ZL-2271-40 | 28.2 ± 0.8 | 16.7 | 137 | −47 |

Cure = 30 minutes at 140° C.
<sup>a</sup>0.2 mm bond-line, test speed = 1.3 mm/min
<sup>b</sup>0.5 mm bond-line, 25 mm mild steel strip
<sup>c</sup>3° C./min ramp rate From the data in Table 3 it can be seen that phase separation has been achieved as indicated by the presence of a rubber Tg on the DMTA. However, some of the polysulfide is still reacting into the epoxy matrix as a reduction in the epoxy Tg temperature is also evident.

The corresponding results obtained using the tolyl bis (dimethylurea) accelerator Amicure UR2T are shown in Table 4:

TABLE 4

| System | <sup>a</sup>Lap shear strength/MPa | <sup>b</sup>T-peel/ N | <sup>c</sup>Tg at 1 Hz/°C. Epoxy | Rubber |
|---|---|---|---|---|
| No polysulfide | 23.9 ± 1.6 | 10.6 | 146 | — |
| 10 phr polysulfide | | | | |
| ZL-2271-20 | — | — | — | — |
| ZL-2271-30 | 29.3 ± 1 | 17.1 | 141 | — |
| ZL-2271-40 | 29.8 ± 1.2 | 14.8 | 142 | −49 |
| 20 phr polysulfide | | | | |
| ZL-2271-20 | 28.0 | 12.2 | 128 | −46 |
| ZL-2271-30 | 27.9 ± 1.3 | 26 | 137 | −44 |
| ZL-2271-40 | 26.6 ± 0.5 | 27 | 138 | −45 |

Cure = 30 minutes at 140° C.
<sup>a</sup>0.2 mm bond-line, test speed = 1.3 mm/min
<sup>b</sup>0.5 mm bond-line, 25 mm mild steel strip
<sup>c</sup>3° C./min ramp rate.

The data in Table 4 again show that some degree of phase separation has been achieved. However, with these systems an improvement in both lap-shear and T-peel strength can be seen, the best systems being those containing 20 phr of ZL-2271-30 or ZL-2271-40. The DMTA was carried out to assess the degree of phase separation. The assessment was based on the position of the epoxy Tg compared to an unmodified epoxy system, and whether a rubber Tg peak was present. This latter point was complicated by the presence of the epoxy β transition at approximately the same temperature as for the rubber transition.

Figure 2:
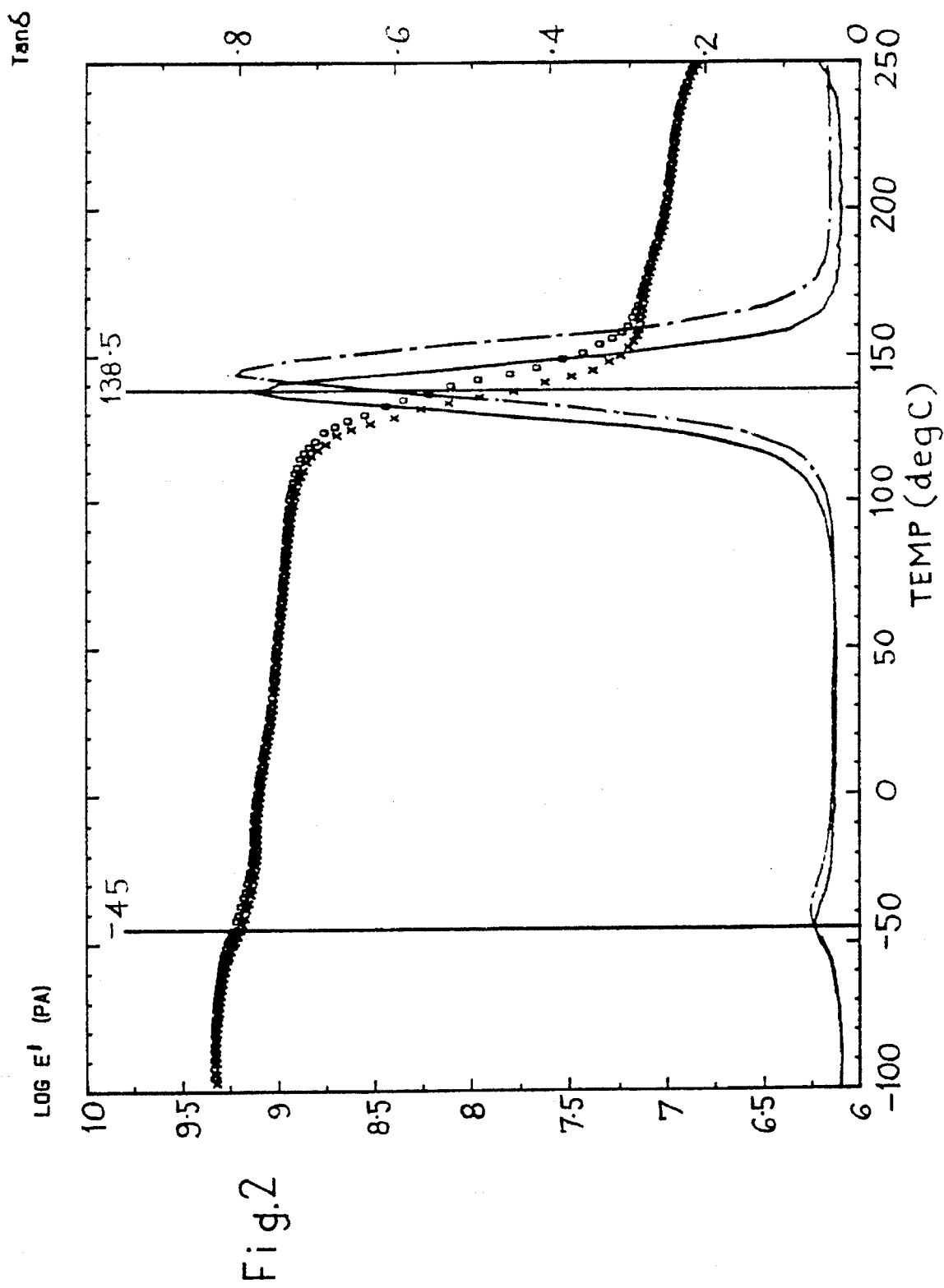
FIG. 2 is a DMTA trace for a similar composition modified in accordance with the invention.

FIG. 1 shows the DMTA plot for an unmodified epoxy system using the Amicure UR2T accelerator, while FIG. 2 shows a similar plot for the same system modified with 20 phr of the 60:40 ZL-2271. The epoxy, Tg, (taken as the peak tan δ temperature) has only been reduced by about 8° C. A rubber phase is indicated at −45° C. by the greater inflection in the modulus on FIG. 2, and also the larger tan δ peak compared to the unmodified epoxy system. A better comparison of the difference in magnitude between the epoxy β transition and the rubber tan δ peak can be seen by comparison of FIG. 2 and FIG. 3. FIG. 3 shows the tan δ traces for the unmodified epoxy system on the same scale as for the polysulfide modified material.

Figure 4A:
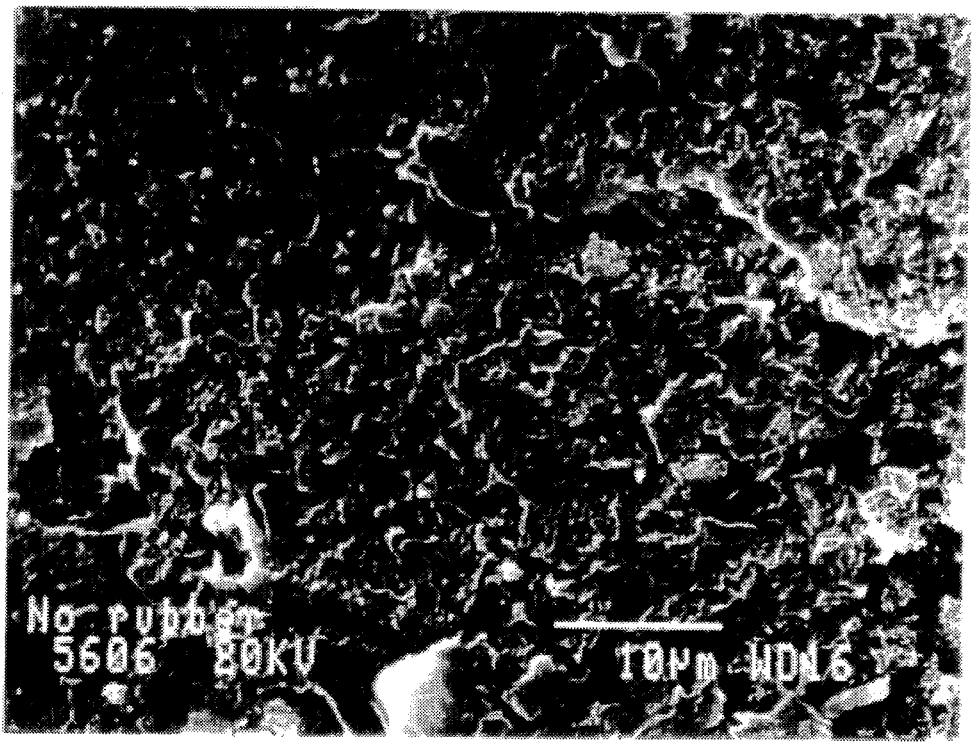
FIGS. 4a and 4b are scanning electron micrographs of the unmodified and modified systems respectively.
Figure 4B:
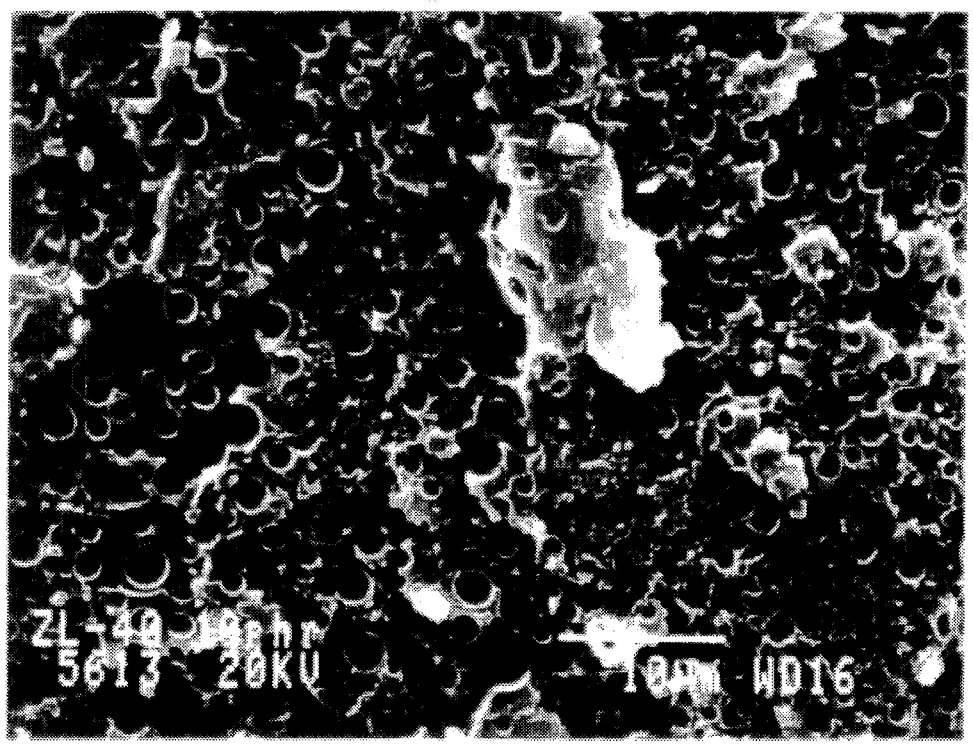

To confirm absolutely the presence of the polysulfide rubber as a phase of discrete particles a scanning electron micrograph (SEM) analysis was undertaken. This proved conclusively the presence of rubber particles, as can be seen in FIG. 4. FIG. 4A is a micrograph of the unmodified epoxy system using the Amicure UR2T accelerator, and FIG. 4b is a micrograph of the same system modified with 10 phr of the 60:40 ZL-2271 polysulfide adduct. The micrographs were taken using the same magnification.

EXAMPLE 2

Further adhesive compositions were formulated from a hexane-modified polysulfide polymer supplied by Morton International, Inc. as above. This is a 66:34 mole ratio hexane: formal polysulfide polymer, the monomer being 1,6-dibromohexane. The polymer was liquid and characterised by an extremely pungent mercaptan type odour.

A portion of the ZL-2338 received was blended with LP2C, as described in Example 1, in a weight ratio of 100:41, (ZL-2338:LP2C), to produce a hydrocarbon content similar to that of ZL-2271-40. This polymer was designated R1137. Both the ZL-2338 and R1137 polymers were then adducted as described in Example 1 and incorporated into the adhesive formulations given in Table 6. The accelerator used was Amicure UR2T. The results of DMTA, lap-shear and T-peel testing are given in Table 6. Some degree of phase separation is again evident, although the rubber phase is not as distinct, as that found for the ZL- 2771 polymers of Example 1.

TABLE 6

| System | <sup>a</sup>Lap shear strength/MPa | <sup>b</sup>T-peel/ N | <sup>c</sup>Tg at 1 Hz/°C. Epoxy | Rubber |
| --- | --- | --- | --- | --- |
| No polysulfide | 20.6 ± 0.9 | 9.7 | 146 | — |
| 10 phr polysulfide | | | | |
| R1137 | 30.3 ± 0.8 | 37.1 | 135 | −53 |
| ZL-2338 | 27.9 ± 2.7 | 38.7 | 128 | −53 |

TABLE 6-continued

| System | <sup>a</sup>Lap shear strength/MPa | <sup>b</sup>T-peel/ N | <sup>c</sup>Tg at 1 Hz/°C. Epoxy | Rubber |
| --- | --- | --- | --- | --- |
| 20 phr polysulfide | | | | |
| R1137 | 27.4 ± 0.2 | 45.3 | 139 | −47 |
| ZL-2338 | 24.1 ± 0.8 | 45 | 135 | −47 |

Cure = 30 minutes at 140° C.
<sup>a</sup>0.2 mm bond-line, test speed = 1.3 mm/min
<sup>b</sup>0.5 mm bond-line, 25 mm mild steel strip
<sup>c</sup>3° C./minute ramp rate The lap-shear values were similar to those found with the ZL-2771 modified systems, but the T-peel figures were considerably improved.

Modification of the polysulfide backbone by incorporation of short alkane chains thus gives polymers with reduced compatability with epoxy resins, so that on curing epoxy systems modified with these polymers phase separation occurs in such a way as to give improved lap-shear and T-peel strengths without an unacceptable reduction in the epoxy Tg.

What is claimed is:

1. A polysulfide-modified epoxy resin composition comprising an epoxy resin and 5 to 30 weight parts per hundred weight parts of said epoxy resin of discrete particles of an epoxy resin adduct of a liquid polysulfide which has a polymer backbone with repeating units of general formula —SS—X—SS— X—, wherein at least 20 mole percent of the groups X are polymethylene groups of 6 to 12 carbon atoms and wherein the product of the molar percentage of said groups X which are polymethylene groups and the average number of carbon atoms in said polymethylene groups is from 200 to 450.

2. A polysulfide-modified epoxy resin composition as claimed in claim 1 wherein said liquid polysulfide also comprises groups X having the general formula

$$-C_2H_4-O-CH_2-O-C_2H_4.$$

3. A polysulfide-modified epoxy resin composition as claimed in claim 2 wherein said liquid polysulfide is produced from a dihaloalkane and a bis-(2-haloethyl) formal.

4. A polysulfide-modified epoxy resin composition as claimed in claim 3 wherein said dihaloalkane is selected from a 1,6-dihalohexane and a 1,10-dihalodecane.

5. A polysulfide-modified epoxy resin composition as claimed in claim 1 wherein said polymethylene groups are decane groups and constitute 20 to 45 mole % of the groups X.

6. A polysulfide-modified epoxy resin composition as claimed in claim 1 wherein said polymethylene groups are hexane groups and constitute from 35 to 70 mole % of the groups X.

7. A polysulfide-modified epoxy resin composition as claimed in claim 1 wherein said liquid polysulfide is produced by blending a first liquid polysulfide having less than the required polymethylene content with a second liquid polysulfide having more than the required polymethylene content, and heating the blend to bring about a sulphur-sulphur interchange reaction.

8. A polysulfide-modified epoxy resin composition as claimed in claim 1 further comprising a curing agent for the epoxy resin, selected from amines and amides.

9. A polysulfide-modified epoxy resin composition as claimed in claim 8 wherein the curing agent is a dicyandiamide.

10. A polysulfide-modified epoxy resin composition as claimed in claim 1 further comprising a cure accelerator.

11. A polysulfide-modified epoxy resin composition as claimed in claim 10 wherein the cure accelerator is selected from 3-phenyl-1,1-dimethylurea and tolyl bis(dimethylurea).

* * * * *